United States Patent [19]

Unverrich

[11] Patent Number: 5,799,358
[45] Date of Patent: Sep. 1, 1998

[54] CANOPY WIPER SYSTEM

[76] Inventor: Clifford D. Unverrich, 241 NE. 125, Portland, Oreg. 97230

[21] Appl. No.: 655,614

[22] Filed: May 30, 1996

[51] Int. Cl.$^6$ .................. B60S 1/46; B60S 1/58; B60P 3/345
[52] U.S. Cl. ............... 15/250.01; 296/164; 296/96.15; 296/96.17; 15/250.3
[58] Field of Search ............ 15/250.19, 250.01, 15/250.04, 250.3, 250.31, 250.001, 250.16; 296/164, 96.15, 96.2, 96.17, 156

[56] References Cited

U.S. PATENT DOCUMENTS

| | | | |
|---|---|---|---|
| D. 330,696 | 11/1992 | Alain | 15/250.3 |
| 2,046,108 | 6/1936 | Drew | 15/250.3 |
| 4,353,111 | 10/1982 | Gallitzendorfer et al. | 15/250.3 |
| 4,675,933 | 6/1987 | Martin, Jr. | 15/250.3 |
| 5,570,923 | 11/1996 | Taylor | 15/250.3 |
| 5,621,942 | 4/1997 | Eustache et al. | 15/250.3 |

*Primary Examiner*—Gary K. Graham

[57] ABSTRACT

A new Canopy Wiper System for offering a kit of wiper system parts that can be added to any existing rear window of a pickup canopy or the like. The inventive device includes a wiper, a wiper arm, a sprayer, a sprayer hose, a fluid container, a wiring harness, and a fastener group. The present invention can be permanently applied to a wide variety of applications and can be connected and disconnected repeatedly so as to allow the canopy the retained versatility of being quickly attached or removed from the chassis of a truck or vehicle within a few minutes of time.

3 Claims, 3 Drawing Sheets

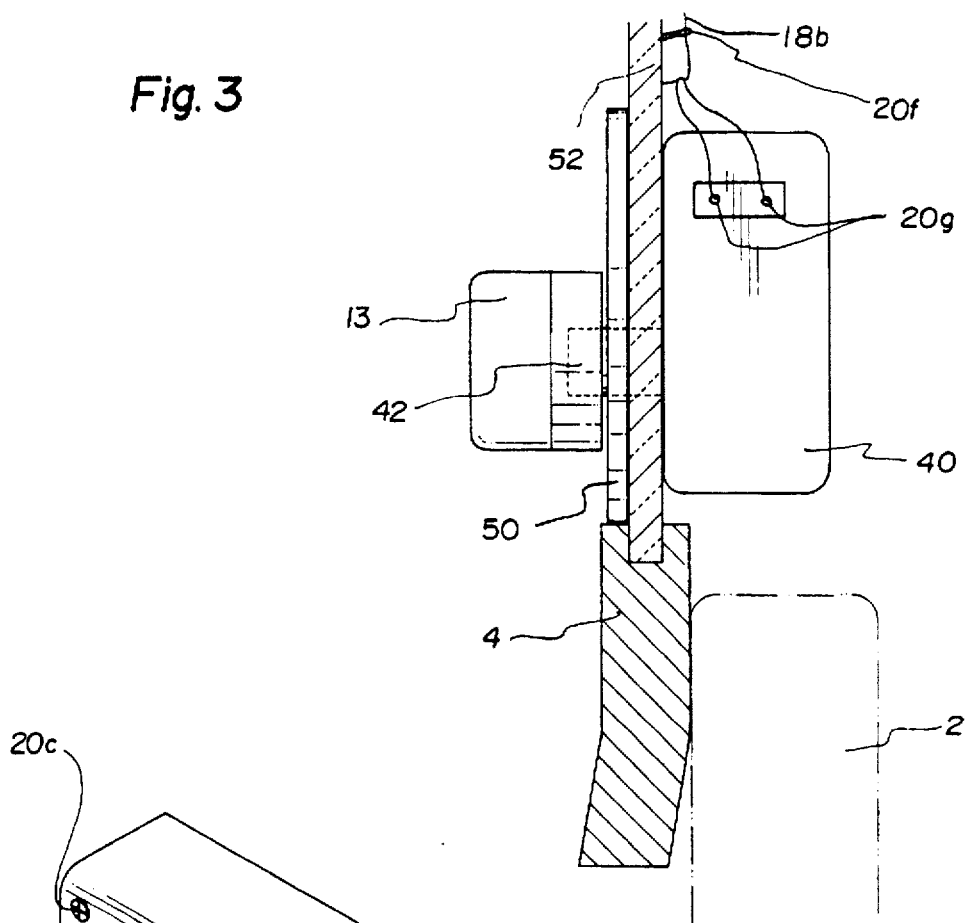
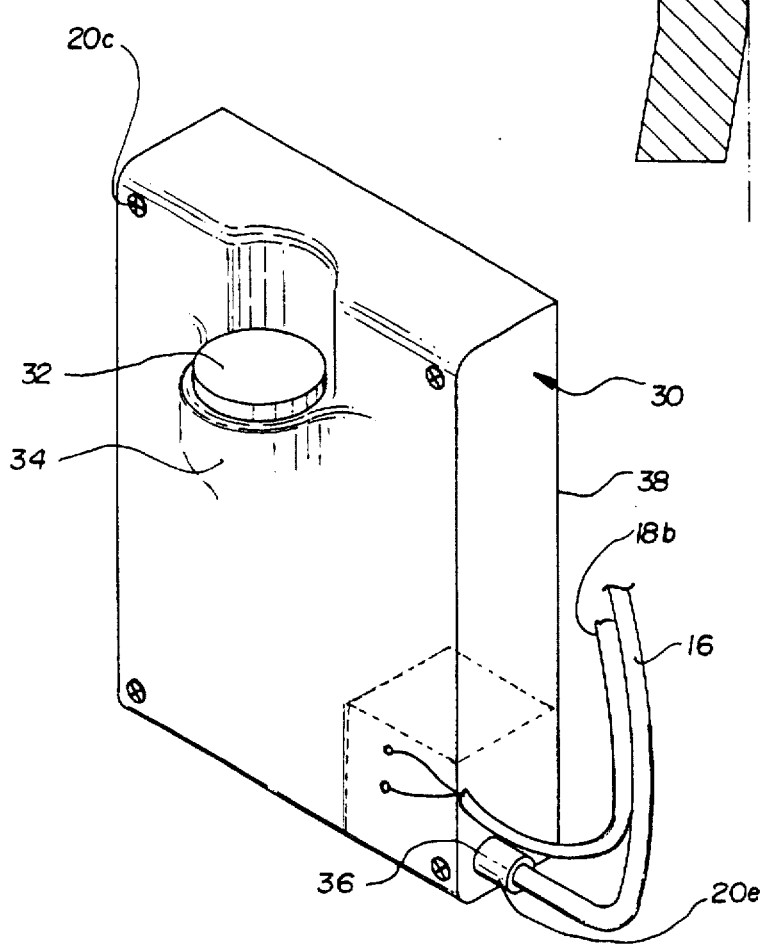

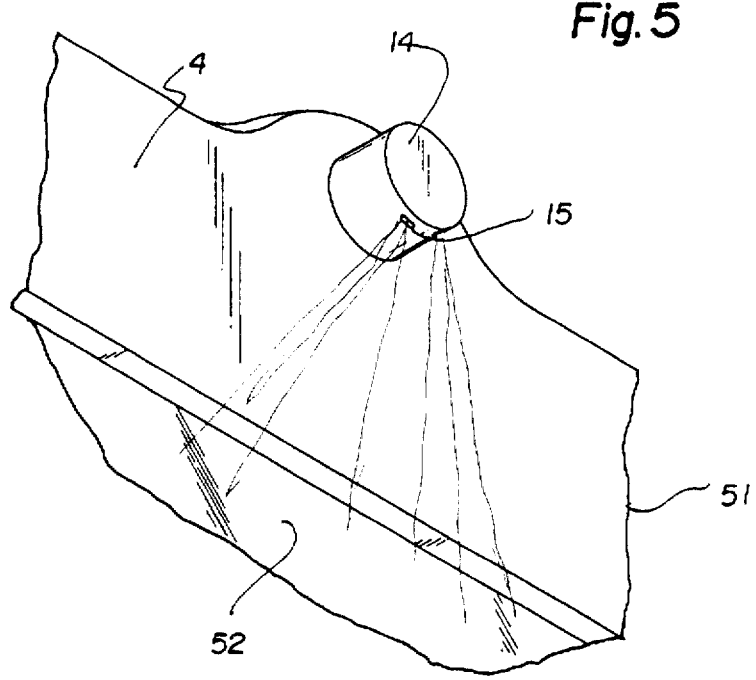
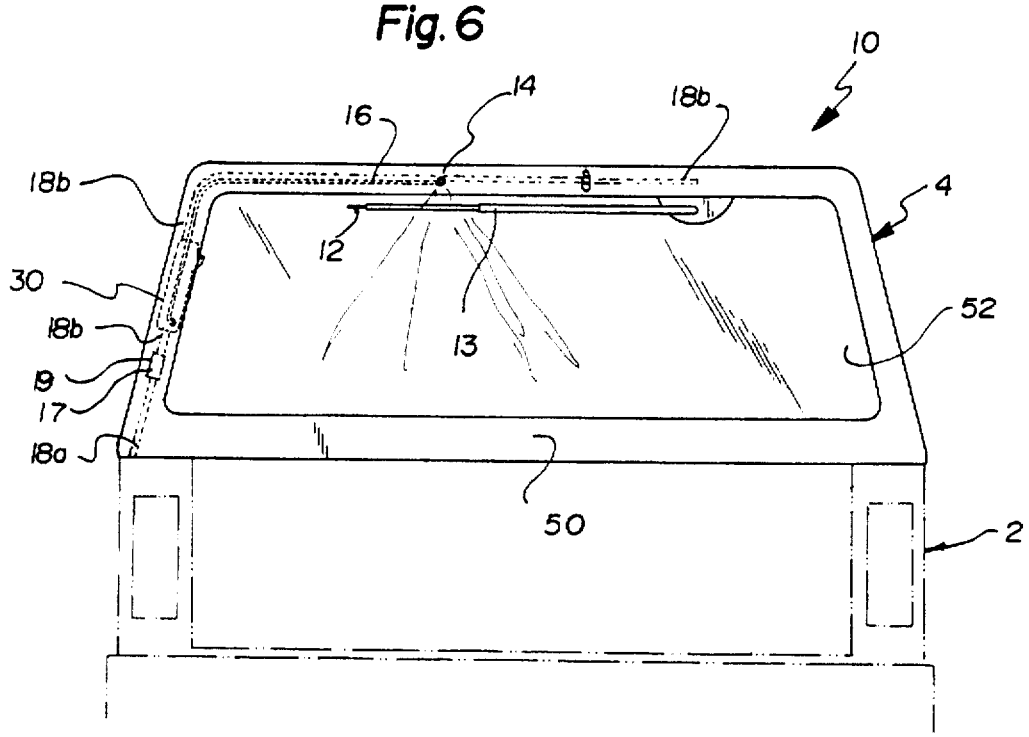

CANOPY WIPER SYSTEM

BACKGROUND OF THE INVENTION

1. Field of the Invention

The present invention relates to a wiper system retrofit kit and more particularly pertains to a new Canopy Wiper System for offering a kit of wiper system parts that can be added to any existing rear window of a pickup canopy or the like.

2. Description of the Prior Art

The use of a wiper system retrofit kit is known in the prior art. More specifically, a wiper system retrofit kit heretofore devised and utilized are known to consist basically of familiar, expected and obvious structural configurations, notwithstanding the myriad of designs encompassed by the crowded prior art which have been developed for the fulfillment of countless objectives and requirements.

Wiper systems are old and well known, as shown by U.S. Pat. No. 4,959,882 issued to Henderson et al. on 2 Oct. 1990; U.S. Pat. No. 4,516,288 issued to Fizyta et al. on 14 May 1985; U.S. Pat. No. 5,327,613 issued to Ohtsu on 12 Jul. 1994; U.S. Pat. No. 4,060,872 issued to Bucklitzsch on 6 Dec. 1977; U.S. Pat. No. 4,013,369 issued to Turek on 22 Mar. 1977; and U.S. Pat. No. 5,363,236 issued to Han on 8 Nov. 1994. The patent to Henderson et al. discloses a windshield wiper weathershield and sprayer mounted to a conventional windshield wiper arm. The patent to Fizyta et al. discloses a windshield washer with a dual spray assembly. Ohtsu discloses an automotive wiper apparatus with combined operation of spraying and wiping. The patents to Bucklitzsch, Turek, and Han are provided as being of general interest. They are less pertinent to the construction and design of the present invention, and have been included as being indicative of the current state of the art.

While these devices fulfill their respective, particular objectives and requirements, the aforementioned patents do not disclose a new Canopy Wiper System which can be mounted to a variety of pickup truck canopys. The inventive device includes a wiper, a wiper arm, a sprayer, a sprayer hose, a fluid container, a wiring harness, and a fastener group.

In these respects, the Canopy Wiper System according to the present invention substantially departs from the conventional concepts and designs of the prior art, and in so doing provides an apparatus primarily developed for the purpose of offering a kit of wiper system parts that can be added to any existing rear window of a pickup canopy of the like.

SUMMARY OF THE INVENTION

In view of the foregoing disadvantages inherent in the known types of a wiper system retrofit kit now present in the prior art, the present invention provides a new Canopy Wiper System construction wherein the same can be utilized for offering a kit of wiper system parts that can be added to any existing rear window of a pickup canopy or the like.

The general purpose of the present invention, which will be described subsequently in greater detail, is to provide a new Canopy Wiper System apparatus and method which has many of the advantages of a wiper system retrofit kit mentioned heretofore and many novel features that result in a new Canopy Wiper System which is not anticipated, rendered obvious, suggested, or even implied by any of the prior art a wiper system retrofit kit, either alone or in any combination thereof.

To attain this, the present invention generally comprises a wiper, a wiper arm, a sprayer, a sprayer hose, a fluid container, a wiring harness, and a fastener group.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Canopy Wiper System apparatus and method which has many of the advantages of the a wiper system retrofit kit mentioned heretofore and many novel features that result in a new Canopy Wiper System which is not anticipated, rendered obvious, suggested, or even implied by any of the prior art a wiper system retrofit kit, either alone or in any combination thereof.

It is another object of the present invention to provide a new Canopy Wiper System which may be easily and efficiently manufactured and marketed.

It is a further object of the present invention to provide a new Canopy Wiper System which is of a durable and reliable construction.

An even further object of the present invention is to provide a new Canopy Wiper System which is susceptible of a low cost of manufacture with regard to both materials and labor, and which accordingly is then susceptible of low prices of sale to the consuming public, thereby making such Canopy Wiper System economically available to the buying public.

Still yet another object of the present invention is to provide a new Canopy Wiper System which provides in the apparatuses and methods of the prior art some of the advantages thereof, while simultaneously overcoming some of the disadvantages normally associated therewith.

Still another object of the present invention is to provide a new Canopy Wiper System for offering a kit of wiper system parts that can be added to any existing rear window of a pickup canopy or the like.

Yet another object of the present invention is to provide a new Canopy Wiper System which includes a wiper, a wiper arm, a sprayer, a sprayer hose, a fluid container, a wiring harness, and a fastener group.

Still yet another object of the present invention is to provide a new Canopy Wiper System that is packaged and sold as a kit of parts that include a fastener group and a wiring group for permanently modifying the vehicle receiving the kit.

Even still another object of the present invention is to provide a new Canopy Wiper System that can be permanently applied to a wide variety of applications and can be connected and disconnected repeatedly so as to allow the canopy the retained versatility of being quickly attached or removed from the chassis of the truck or vehicle within a few minutes of time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross section view taken along line 3—3 of FIG. 1 of the present invention.

FIG. 4 is an inside-out view taken along line 4—4 of FIG. 1 of the invention.

FIG. 5 is a bottom enlarged view taken along line 5—5 of FIG. 1 of the sprayer of the present invention.

FIG. 6 is a rear view of an alternative embodiment of the present invention.

DESCRIPTION OF THE PREFERRED EMBODIMENT

Figure 1:
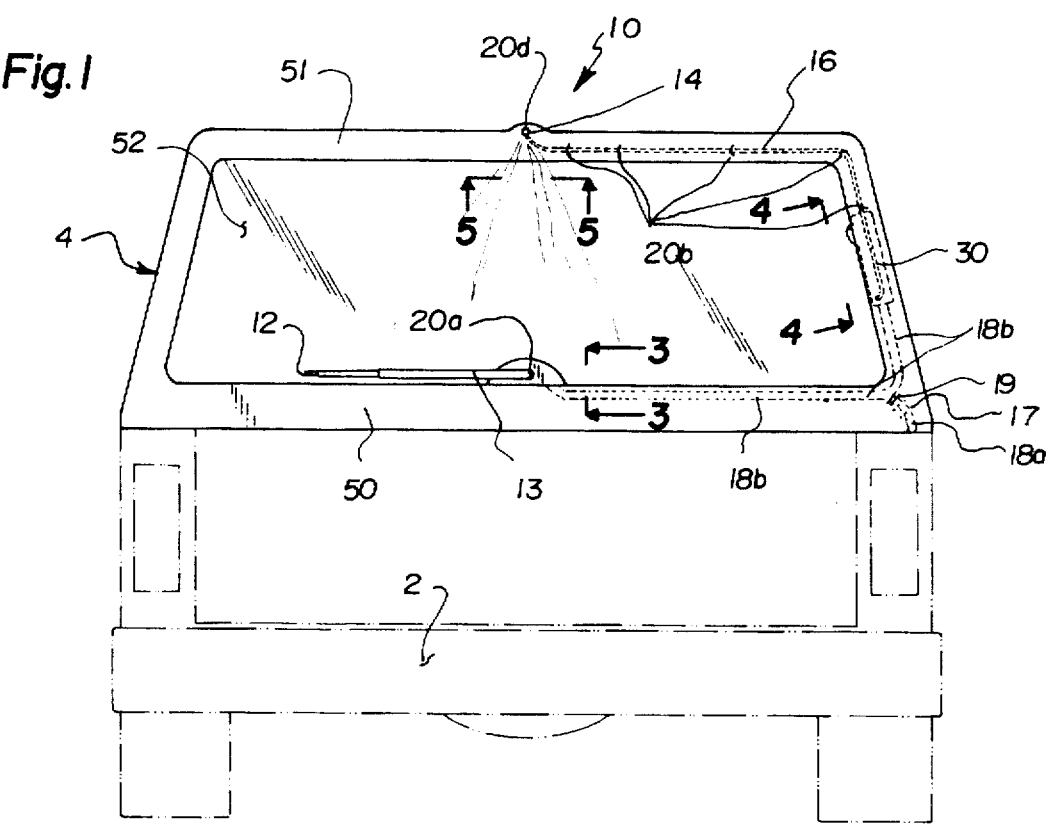
FIG. 1 is a rear view of a new Canopy Wiper System installed on a pickup truck canopy according to the present invention.
Figure 2:
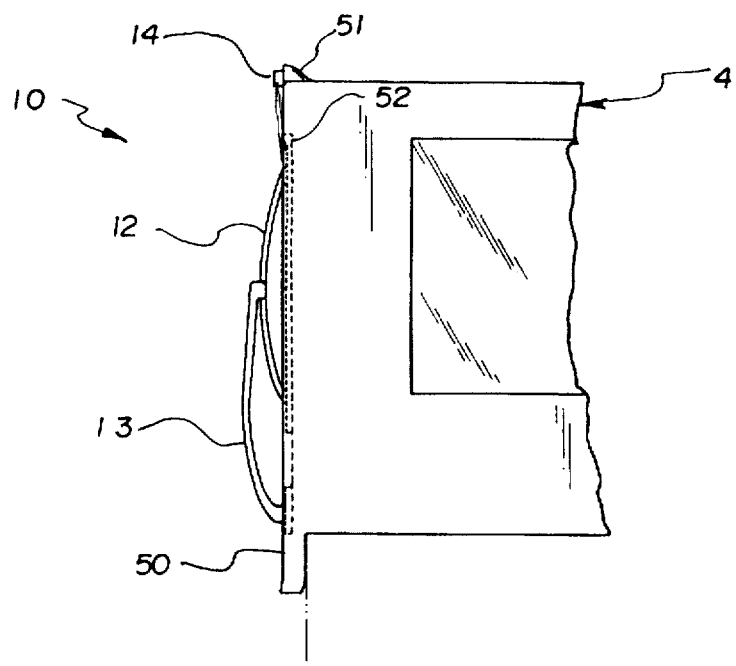
FIG. 2 is a side elevation view thereof.

With reference now to the drawings, and in particular to FIGS. 1 through 6 thereof, a new Canopy Wiper System embodying the principles and concepts of the present invention and generally designated by the reference numeral 10 will be described.

More specifically, it will be noted that the Canopy Wiper System 10 comprises a wiper 12, a wiper arm 13, a sprayer 14, a sprayer hose 16, a fluid container 30, a wiring harness 18, and a fastener group 20.

As best illustrated in FIGS. 1 through 6, it can be shown that the Canopy Wiper System 10, will require the installer to appropriately splice into existing vehicle electrical circuits as well as form holes and mount to the various materials that truck canopys and the like are made of.

In use, the Canopy Wiper System 10, a wiper system retrofit kit, is applied to a truck 2 by first connecting a permanent chassis wire harness 18a to an existing electrical circuit of the truck 2 or other vehicle; for instance, the front windshield wiper circuit or a light circuit. Then a pivot hole to receive a grommetted pivot 20a is formed into a first support member 50 of a canopy 4 of the truck 2 at a desired location as suggested by FIG. 1 or by the alternative embodiment as shown in FIG. 6.

A sprayer 14 is mounted to a second support member 51 at an upper central location on the rear of the canopy 4 by a sealed nozzle mounting 20d. The sprayer 14 is oriented so that a nozzle outlet 15 is pointed down and inward, toward a window 52 of the truck 2 or vehicle.

A fluid container 30 is mounted with fluid container mounting screws 20c which are used to hold the container base 38 in contact with the canopy 4. The fluid container 30 has a sprayer hose 16 fastened to it at a fluid outlet 36 by a tube seal nut 20e which allows the sprayer hose 16 to be in fluid connection with the fluid container 30. The sprayer hose 16 is also in fluid connection with the sprayer 14. The fluid is forced from the container 30, through the sprayer hose 16, the sprayer 14, and the nozzle outlet 15 by a pump (not shown) but which can be included in the fluid container 30 by conventional methods which are old and well known, or mounted onto the canopy 4 adjacent to the sprayer 14, also in a fashion that is old and well known.

A motor 40 is mounted to the inside of the canopy 4 by a motor mounting means supported a first support member 50, the motor 40 has an output shaft 42 which extends through the pivot 20a which is formed into the first support member 50 of the canopy 4 of the truck 2. A wiper 12 and a wiper arm 13 are then mounted to the outside end of the output shaft 42 and oriented so that as the motor 40 operates, the wiper is moved from one side of the window to the other side of the window. The wiper 12 and the wiper arm 13 are held in contact with the window by conventional wiper spring biased design which is old and well known to the art.

A canopy wire harness 18b is fastened to the canopy 4 by wire harness clips 20f, the canopy wire harness 18b has a male plug 19 at one end which mates with and is inserted into a female receptacle 17 which terminates the permanent chassis wire harness 18a. The canopy wire harness 18b is fastened to the motor 40 by motor-wire lead screws 20g and to the pump by pump-wire lead screws.

When the existing electrical circuit is energized by a switch such as the existing wiper switch for the front wiper, the Canopy Wiper System is also activated. Likewise, if wired appropriately, when the front washer spray system is energized by the existing switch, the Canopy Wiper System's sprayer can also be activated. In addition to this, if alternate switches are added to the Canopy Wiper System, then the wiper and sprayer can be independently controlled.

When the canopy 4 is removed from the truck 2, the canopy wire harness 18b can be unplugged from the permanent chassis wire harness 18a. The canopy wire harness 18b can be routed and operated along side any already existing wire harnesses which might run lights or other desirable accessories.

In an alternate embodiment as shown by FIG. 6, the wiper 12 and wiper arm 13 can be located adjacent to the sprayer 14, at an upper central location on the rear of the canopy 4, to bring about slightly different results and to offer an alternative for mounting the pivot 20a, motor 40, canopy wire harness 18b and sprayer hose 16. Also, not shown, but anticipated by the present invention, is still another embodiment where the sprayer 14 is mounted to and included on the wiper arm 13, so that nozzle outlet 15 is pointed toward the window 52 and moves along with the wiper 12 and the wiper arm 13.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A canopy and wiper system for use with a pickup truck of the type having a power source outlet, the canopy and wiper system comprising:

a removable canopy adapted to removably attach to the truck, the canopy having an interior, a rear window and a power transference means removably connectable to the power source outlet of the truck;

a pivoting wiper arm mounted to the canopy such that the wiper arm remains attached to the canopy when the canopy is removed from the truck;

a wiper attached to said wiper arm, said wiper positioned to contact the rear window;

a motor attachable to said pivoting wiper arm through the rear window of said canopy such that the motor is mounted to the canopy such that the motor remains attached to the canopy when the canopy is removed from the truck, the motor being mounted to the canopy by an attachment means including a first support member being engaged to an output shaft of said motor, said output shaft further engaging said wiper arm such that said motor urges said wiper arm back and forth across the rear window;

said motor further having motor lead screws;

canopy harness wires connected to said motor lead screws at a proximal end of said canopy harness wires, said canopy harness wires attached to the canopy by a number of harness wire clips such that the canopy harness wires remain attached to the canopy when the canopy is removed from the truck, said canopy harness wires further having a coupling means for coupling to the power transference means of the canopy, the coupling means attached to the canopy harness wires at a distal end;

a fluid container having a fill cap, fill spout and a fluid outlet, said fluid container mounted to the interior of the canopy such that the fluid container remains attached to the canopy when the canopy is removed from the truck;

a sprayer hose in fluid communication with the fluid outlet, said sprayer hose attached to the interior of the canopy by a number of sprayer hose clips such that the sprayer hose remains attached to the canopy when the canopy is removed from the truck, said sprayer hose having a distal hose end; and a sprayer adapted for attachment to the sprayer hose distal end through the canopy such that the sprayer remains attached to the canopy when the canopy is removed from the truck, the sprayer in fluid communication with the spray hose such that fluid within the fluid container can be dispensed through the sprayer.

2. The canopy and wiper system of claim 1 wherein the sprayer is positioned proximate a top edge of the rear window.

3. The canopy and wiper system of claim 2, wherein the pivoting wiper arm pivots with respect to a point an offset proximate the top edge of the rear window.

* * * * *